United States Patent [19]

Brearley

[11] 4,270,808
[45] Jun. 2, 1981

[54] ANTI-LOCK BRAKE CONTROL SYSTEMS FOR MULTI-AXLE VEHICLES

[75] Inventor: Malcolm Brearley, Solihull, England

[73] Assignee: Girling Limited, Birmingham, United Kingdom

[21] Appl. No.: 30,433

[22] Filed: Apr. 16, 1979

[30] Foreign Application Priority Data

Apr. 22, 1978 [GB] United Kingdom ............... 16005/78

[51] Int. Cl.³ .............................................. B60T 8/04
[52] U.S. Cl. ....................................... 303/92; 303/20
[58] Field of Search .................................... 303/92, 20

[56] References Cited

U.S. PATENT DOCUMENTS

| 3,891,279 | 6/1975 | Frait ........................................ 303/92 |
| 3,966,265 | 6/1976 | Taylor et al. ........................... 303/92 |
| 3,995,912 | 12/1976 | McNinch, Jr. et al. ................ 303/92 |

FOREIGN PATENT DOCUMENTS 2352496  4/1975  Fed. Rep. of Germany ............. 303/92

*Primary Examiner*—J. D. Miller
*Assistant Examiner*—Reinhard J. Eisenzopf
*Attorney, Agent, or Firm*—Scrivener, Clarke, Scrivener and Johnson

[57] ABSTRACT

Anti-skid brake control systems are described in which anti-skid brake control modules associated with the braked axles are each provided with a failsafe circuit and these failsafe circuits are connected in cascade fashion to form a chain so that an input signal applied to a first failsafe circuit will propagate through the chain of failsafe circuits to the output of the last failsafe circuit only if the wiring connecting the modules is correct, the failsafe circuits are themselves operating correctly and electrical power is being supplied to each module, a warning being given to the driver of the vehicle if the output signal from the last failsafe circuit fails. In a previously proposed system the warning given is only produced in the event of a fault, and there is no positive indication of correct operation of the system at switch on. Circuits are here described in which the vehicle ignition switch is arranged to apply a fault pulse to the input of the first failsafe circuit in the chain at switch-on of the ignition and the response of the output of the last failsafe circuit to the pulse is monitored by a suitable monitor unit. Some of the failsafe circuits incorporate switch-off circuits which are so arranged that, on the occurence of a fault in the chain upstream of that failsafe circuit, the switch-off circuits operate an inhibit device to inhibit operation of one or more of the brake release circuits which are downstream of the point at which the fault exists.

5 Claims, 9 Drawing Figures

ANTI-LOCK BRAKE CONTROL SYSTEMS FOR MULTI-AXLE VEHICLES

This invention relates to multi-axle wheeled vehicles provided with an anti-skid braking system, and relates in particular to vehicles in which each of a plurality of the braked axles has a separate anti-skid brake release means associated with it.

The term 'multi-axle' is intended to include a vehicle having only two axles.

It is known from U.S. Pat. No. 3,891,279 to provide a failsafe system in an anti-skid brake control system for a multi-axle wheeled vehicle in which each of the anti-skid brake control modules associated with the braked axles is provided with a failsafe circuit and these failsafe circuits are connected in cascade fashion to form a chain so that an input signal applied to a first failsafe circuit will propagate through the chain of failsafe circuits to the output of the last failsafe circuit only if the wiring connecting the modules is correct, the failsafe circuits are themselves operating correctly and electrical power is being supplied to each module, a warning being given to the driver of the vehicle if the output signal from the last failsafe circuit fails.

That failsafe system is designed to act primarily as a warning system, although it is suggested that when a warning is produced this might be used to disable the entire anti-lock brake control system. Also, the warning given is only produced in the event of a fault, and there is no positive indication of correct operation of the system at switch on, the input signal to the first failsafe circuit being taken from the positive power supply line so that the input signal is present continually from the instant the system is switched on.

According to one aspect of the invention a multi-axle wheeled vehicle comprises a respective brake for each axle, a respective speed sensor associated with each axle, a respective brake release means associated with each axle and responsive to the respective speed sensor to release the respective brake on the occurence of a skid condition at that axle, a respective failsafe circuit associated with each brake release means, means connecting the failsafe circuits in cascade to form a chain so that an input signal applied to a first of the failsafe circuits will normally propogate through the chain to the output of a last of the failsafe circuits but will be interrupted if a fault develops, a warning device responsive to a signal at the output of the last failsafe circuit, and a switch connected to the input of the first failsafe unit to provide a test pulse on each operation of the vehicle.

The switch is preferably a switch which is operated prior to the commencement of each journey, and conveniently the switch is arranged to be operated by the ignition key at switch-on of the ignition.

According to a second aspect of the invention a multi-axle wheeled vehicle comprises a respective brake for each axle, a respective speed sensor associated with each axle, a respective brake release means associated with each axle and responsive to the respective speed sensor to release the respective brake on the occurence of a skid condition at that axle, a respective failsafe circuit associated with each brake release means, means connecting the failsafe circuits in cascade to form a chain so that an input signal applied to a first failsafe circuit in the chain will normally propogate through the chain to the output of the last failsafe circuit in the chain, and inhibit means responsive to an interruption in said signal at a point in the chain and caused by a fault upstream of that point, the inhibit means being connected to the brake release means associated with a failsafe circuit that is downstream of said point, and being operative to inhibit operation of that brake release means.

One or more preselected brake release means may be inhibited on the occurence of a fault in the chain upstream of the failsafe circuit associated with the preselected brake release means.

Preferably the failsafe circuits are connected in the chain in the same order as the axles are arranged on the vehicle, and depending upon the type of vehicle the input signal may be propogated through the failsafe circuits in the forwards or rearwards directions of the vehicle, but usually it will be propogated in the forwards direction and the inhibit means will be arranged to inhibit operation of at least the brake release means associated with a steerable front axle.

This last-mentioned arrangement is advantageous in that it enables the anti-skid brake control action of the front steering axle to be disabled by any rearwards fault in the failsafe system without necessarily disabling the anti-lock brake control action on any axle to the rear of the steering axle. Thus, under fault conditions there is no anti-lock action on the steering axle that would render steering effective under skid conditions and allow skewing of a rigid vehicle or jack-knifing in the case of an articulated vehicle, but anti-lock control on the other axles may be retained to maximise braking effectiveness.

The invention will now be further described, by way of example only, with reference to the accompanying drawings in which.

Figure 1:
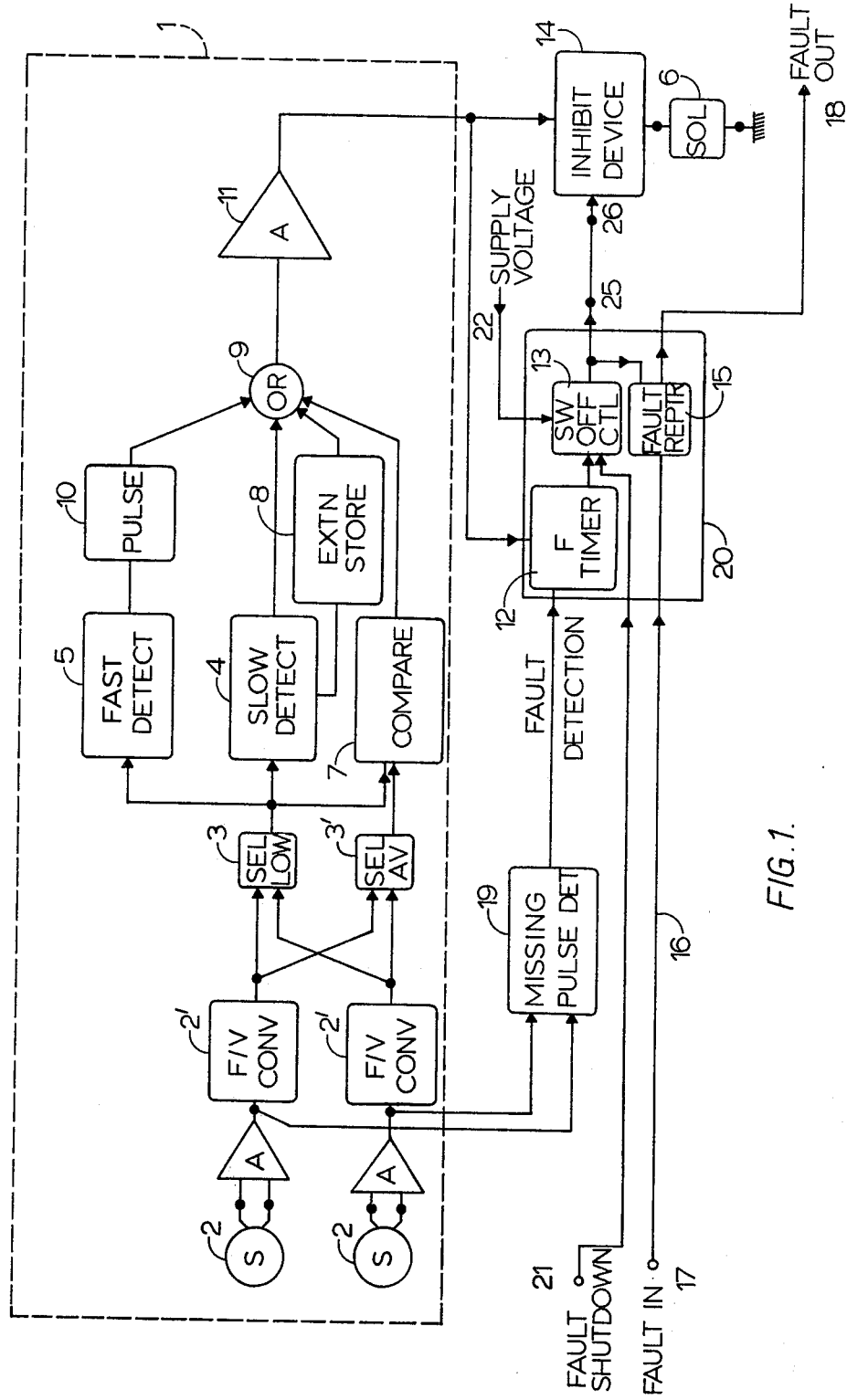
FIG. 1 is a schematic diagram of an anti-skid brake control module for controlling the braking of the wheels of one axle and incorporating a failsafe circuit having two input connections, one of which is optional, and in accordance with the invention.

With reference to FIG. 1 it should be appreciated that the design of the basic anti-lock circuit 1, indicated in dotted outline, is not relevant to the invention and it will not therefore be described in any detail. If desired a different basic anti-lock circuit could be employed in conjunction with the failsafe circuit without affecting the operation of the failsafe circuit. However, briefly the circuit 1 comprises left and right wheel speed sensors 2 that produce pulsed wheel speed signals that are converted to voltage signals in frequency/voltage converters 2'. The lower speed signal is selected by selector 3 and fed to circuitry including two wheel deceleration sensing switches 4 and 5, switch 4 having a slow response and switch 5 having a fast response, the switches between them producing a brake pressure release pulse with a length dependent on the wheel speed dip and wheel speed recovery, this pulse energising a solenoid 6 to effect brake pressure release while it lasts. The antilock circuit also incorporates a comparator unit 7, an averaging unit 3', an extension store unit 8, an OR-gate 9, pulse circuit 10, and output amplifier 11. The fast and slow switch arrangement and other features of the basic anti-lock circuit are described in our co-pending U.K. Pat. Nos. 14238/77, 14239/77 and 14240/77.

The failsafe circuit 20 comprises a timer 12 that controls operation of a switch-off circuit 13 that in turn controls operation of an inhibit device 14 connected between the output amplifier 11 and the input to the brake release solenoid 6. The timer 12 also controls operation of a fault repeater circuit 15 connected in a fault line 16 between an input 17 and output 18. The timer 12 times the brake release pulse from the output amplifier 11 of the basic anti-lock circuit 1 and operates the inhibit device 14 via the switch-off circuit 13 to inhibit further energization of the solenoid 6 if the brake release pulse exceeds a preset limit, typically 3 seconds. The switch-off circuit 13 and fault repeater 15 will be described in detail hereafter.

The inhibit device 14 preferably comprises a transistor, not shown, connected in series between the output amplifier 11 and solenoid 6 so that the transistor has to be turned on to allow the solenoid 6 to be energized. The transistor is arranged to be held in the non-conducting state by the switch-off circuit 13 for the time that a brake release pulse exists after the preset limit set by the timer 12, the timer 12 then re-setting and causing the switch-off circuit 13 to release the inhibit condition.

The preset time limit set by the timer 12 corresponds to the maximum duration of a brake release pulse during normal anti-lock brake control action, and any longer pulse is taken as being indicative of a fault condition such as that caused by a component failure, a sensor fault, a failure of the brake pressure release valve to effect brake pressure release, or brake malfunction such as sticking on.

A fault condition that is specifically sensed by circuit 1 operating in conjunction with timer 12 is sensor failure as indicated by a difference in frequency between wheel speed signals produced by the left and right wheel speed sensors 2. The comparator 7 compares the voltages of the two signals produced by frequency/voltage convertors 2' and triggers a brake pressure release pulse at the output of amplifier 11 once a preset voltage difference is exceeded, this pulse triggering the timer 12, which in turn inhibits brake pressure release beyond said preset time limit set by the timer 12. If just one of the wheels tends to lock a brake pressure release pulse will be produced in the normal way and if this desists within said preset time limit no fault condition is signalled; therefore normal anti-lock brake control action is effective where the two wheels are running on different $\mu$ surfaces and one of the wheels tends towards a high slip condition, such as during maneuvering. In order to avoid responding to wheel speed differences that occur at low speeds due to difference of wheel size and during cornering a wheel speed inhibit signal is used to inhibit operation of the comparator 7 at low speeds, typically below 25 to 30 k.p.h.

Another fault condition that is specifically sensed is that of a missing wheel speed sensor pulse due to damage in the sensor, such as a damaged or distorted excitor tooth in the sensor rotor. The cyclic loss of one or more wheel speed pulses would otherwise produce rapid cyclic brake pressure release pulses that could wear out the brake pressure release valve and, even worse, could cause a progressive loss of brake pressure. A special circuit 19 is therefore provided to detect missing pulses from either sensor 2 and to operate the timer 12 continuously if the pulses from sensors 2 occur cyclically so that if pulses are missing on a cyclic basis for more than said preset time limit the timer 12 operates to inhibit brake pressure release. The circuit 19 may, for example, be that described in our co-pending British Patent Application Nos. 7794/78 and 7906170, in which the wheel speed voltage signal is integrated in the period between successive pulses and an output pulse is triggered if the integrated sum in any period exceeds a preset threshold corresponding to normally occurring regularly spaced wheel speed pulses, successive cyclically occurring output pulses producing a continuous output signal to the timer.

Failure of the power supply is also detected using the switch-off circuit 13 so that this operates when the supply voltage falls below a preset minimum and triggers the inhibit device 14 to inhibit brake pressure release.

Operation of the switch-off circuit 13 in response to any of the above described fault conditions operates the inhibit device 14 to inhibit brake pressure release and also operates the fault repeater circuit 15, which signals a warning of the fault at a fault line output terminal 18.

The failsafe circuit 20 has two fault line input terminals 17 and 21, of which 17 is connected to the fault repeater circuit 15 and the other of which 21 is optional and is connected to the switch-off circuit 13. As will now be explained in more detail the response of the failsafe circuit 20 to an input signal depends upon whether terminal 17 only is employed or whether both terminals 17 and 21 are employed.

Figure 2:
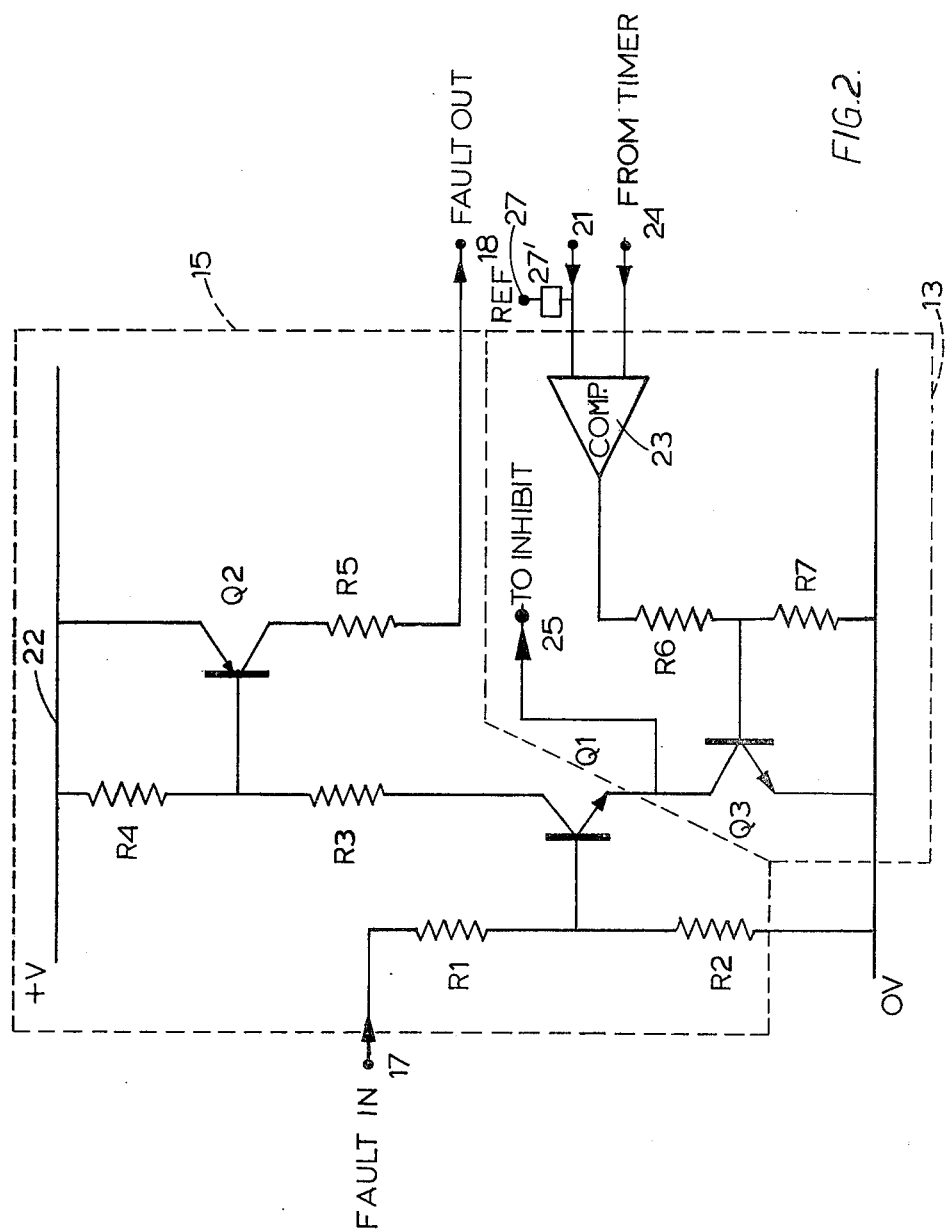
FIG. 2 is a circuit diagram of the switch-off and fault repeater circuits of the failsafe circuit incorporated in the module of FIG. 1.

FIG. 2 shows the circuit diagram for the switch-off circuit 13 and fault repeater circuit 15 of the failsafe circuit 20. The fault repeater circuit 15 comprises two transistors $Q_1$ and $Q_2$, and the switch-off circuit 13 comprises a further transistor $Q_3$. The emitter of transistor $Q_1$ is connected to the collector of transistor $Q_3$ which has its emitter connected to ground. The collector of transistor $Q_1$ is connected to the positive supply line 22 through resistors $R_3$ and $R_4$ arranged in series, and the transistor $Q_1$ is biassed normally to conduct by a resistor $R_2$ connected between its base and ground, a further resistor $R_1$ being connected between its base and input terminal 17. The junction between resistors $R_3$ and $R_4$ is connected to the base of transistor $Q_2$ which has its emitter connected directly to positive supply line 22 whereby transistor $Q_2$ is biassed normally to conduct. The collector of $Q_2$ is connected through a resistor $R_5$ to the fault output terminal 18 so that when transistor $Q_2$ is switched off an output signal is produced at terminal 18. Transistor $Q_3$ is biassed normally to conduct by a resistor $R_7$ connected between its base and ground, and its base is also connected through a resistor $R_6$ to the output of a comparator 23 of which one input is connected to a reference voltage terminal 27 by a diode clamp 27' and to the alternative fault input terminal 21, and the other input 24 of the comparator 23 is connected to a timing capacitor, not shown, of the fault timer 12. The junction between the emitter of transistor $Q_1$ and the collector of transistor $Q_3$ is connected to an output terminal 25 for connection to the control terminal 26 of inhibit device 14.

When a fault signal is applied to fault input terminal 17, irrespective of whether the fault signal is also applied to terminal 21, transistor $Q_1$ is made non-conducting, whereupon transistor $Q_2$ becomes non-conducting and supplies an output fault signal at output terminal 18. Thus the transistors $Q_1$ and $Q_2$ act to repeat the fault signal.

Normally reference voltage terminal 27 is connected to a suitable reference voltage, and comparator 23 compares this reference voltage with a voltage signal from the timing capacitor of the fault timer 12, the comparator producing an output signal to make transistor $Q_3$ non-conducting when the capacitor voltage is equal to the reference voltage, and the reference voltage being chosen to correspond to the preset time limit for the brake release pulse. Switching-off of transistor $Q_3$ produces an inhibit signal at terminal 25 that operates the inhibit device 14 to inhibit brake pressure release.

Thus if both fault input terminals 21 and 17 are supplied with the fault signal the input fault signal causes the comparator 23 to produce said output signal to make transistor $Q_3$ non-conducting so that the inhibit device 14 is operated, and an output fault signal is also produced at terminal 18. Also, if a fault develops in the switch-off circuit 13 transistor $Q_3$ will switch off transistor $Q_1$ and a fault signal will be produced at the terminal 18. Thus transistor $Q_1$ constitutes a switch having two input connections, one from terminal 17 and the other from transistor $Q_3$.

Failure in either the positive or negative side of the power supply also makes transistors $Q_1$ to $Q_3$ non-conducting to inhibit brake release and produce an output fault signal at terminal 18.

When fault input terminal 17 only is used the other input terminal 21 is connected to the +V supply line 22.

Figure 3:
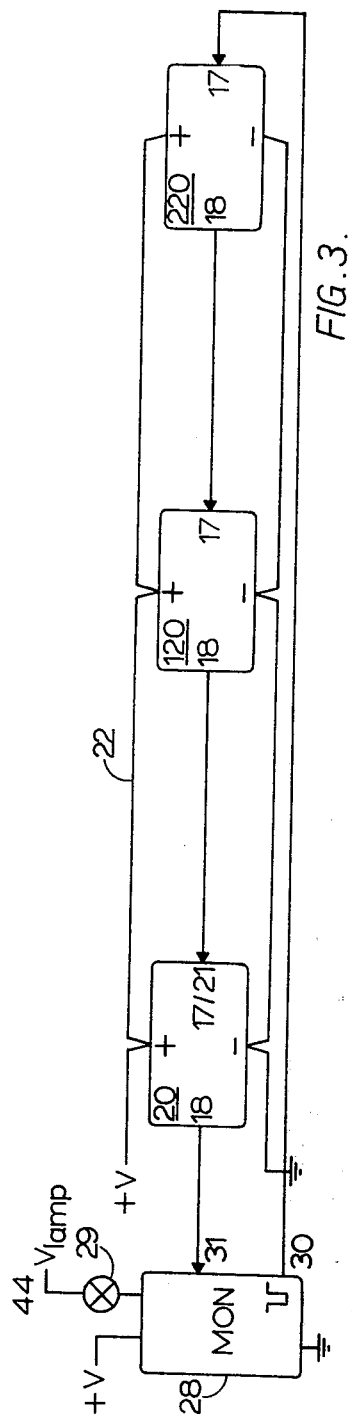
FIG. 3 is a schematic circuit diagram showing three failsafe circuits of a rigid chassis vehicle connected up to form a chain.

FIG. 3 shows three failsafe circuits 20, 120 and 220, each associated with an anti-lock brake control module controlling braking of a different axle of a three axle, rigid vehicle. The fault inputs and outputs of these failsafe circuits are interconnected in a cascade fashion so that the fault output 18 of the rear axle failsafe circuit 220 is connected to the fault input terminal 17 only of the middle axle failsafe circuit 120, and the fault output 18 of the middle axle failsafe circuit 120 is connected to the fault input terminals 17 and 21 of the front axle failsafe circuit 20. A fault warning monitor 28 including a warning lamp 29 having a low voltage supply 44 is provided in the cab of the vehicle and has a fault output connection 30 that is connected to the fault input terminal 17 of the rear axle failsafe circuit 220, and a fault input connection 31 that is connected to the fault output terminal 18 of the front axle failsafe circuit 20. The circuit of the fault warning monitor 28 will be described in more detail hereafter.

In normal use, a voltage signal is applied to the output 30 of the monitor 28 and if there is no fault in the system this is passed forward by the fault repeater circuit 15 in each failsafe circuit 20 so that it reaches the input 31 of the monitor and prevents the warning lamp 29 from being lit. If, however, there is a break in the fault line this signal is interrupted and the lack of a signal at the input 31 of the monitor 28 causes the warning lamp 29 to light. The power circuit for driving the lamp may be incorporated in the last failsafe circuit 20, although a similar power circuit may be provided in each failsafe circuit 20, 120, 220 so that all of the failsafe circuits are the same for convenience of manufacture. A fault in any of the control modules and failsafe circuits or a failure of the power supply, as described above, will cause the respective fault repeater circuit 15 to interrupt the signal in the fault line so that the warning lamp 29 is lit.

The output signal supplied by the monitor at 30 is interrupted momentarily when the system is switched on by the vehicle ignition key, thereby producing a test pulse which is passed on by all of the failsafe circuits 220, 120, 20 to the input 31 of the monitor 28 to light the warning lamp 29 momentarily if the system is functioning correctly. The driver is therefore given a positive indication that the anti-lock brake control system and failsafe system is working correctly at switch-on.

The provision of optional input connection 21 of each failsafe circuit 20, 120, 220 enables a choice to be made in applying the circuit to any particular vehicle as to whether an incoming fault signal is to be passed on simply as a warning signal or to be used to inhibit brake pressure release as well as being passed on as a warning signal. When the input 17 alone is used, the fault repeater circuit 15 receives the input signal direct and passes this on to the output 18, operation of the inhibit device 14 being unaffected by the input signal. However, if the input 21 is also used, the input signal passes to the switch-off circuit 13 and, in the event of an input signal being a fault signal, the switch-off circuit 13 is operated and triggers the inhibit device 14 to prevent brake pressure release and operate the fault repeater circuit 15 so that the latter passes on the fault signal to the output 18. It is therefore possible in general, by selecting the appropriate inputs 17 and 21, to arrange that a fault signal disables the anti-lock brake control action in selected modules ahead of it. When, as shown in FIG. 3, connection 21 is employed in the failsafe circuit 20 associated with the steerable front axle, and connection 17 only is used in failsafe circuit 120 and 220, anti-lock brake control action is disabled on the front steering axle by any rearward fault, but anti-lock brake control action is not disabled on the intermediate axle by a rearward fault.

Figure 4:
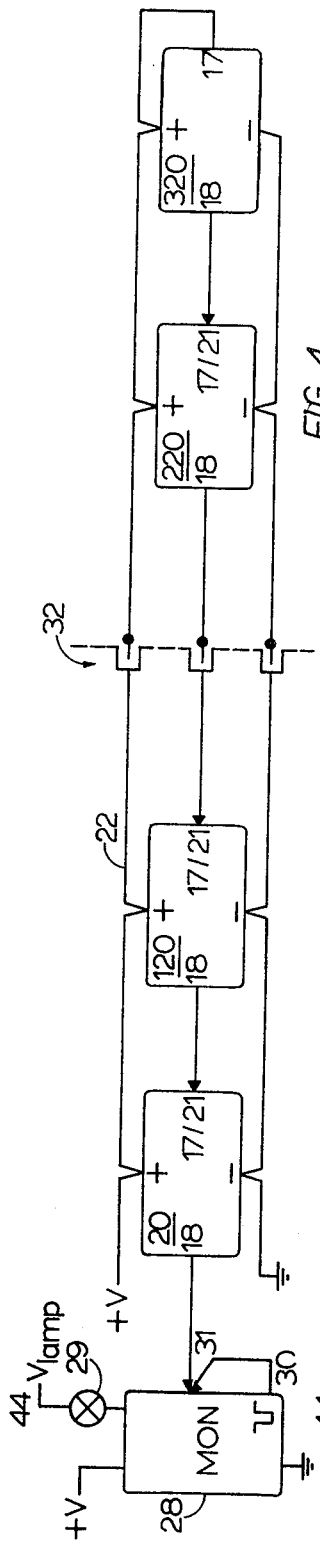
FIG. 4 is a circuit diagram similar to FIG. 3 but for an articulated vehicle having two tractor axles with braked wheels and two trailer axles with braked wheels.
Figure 7:
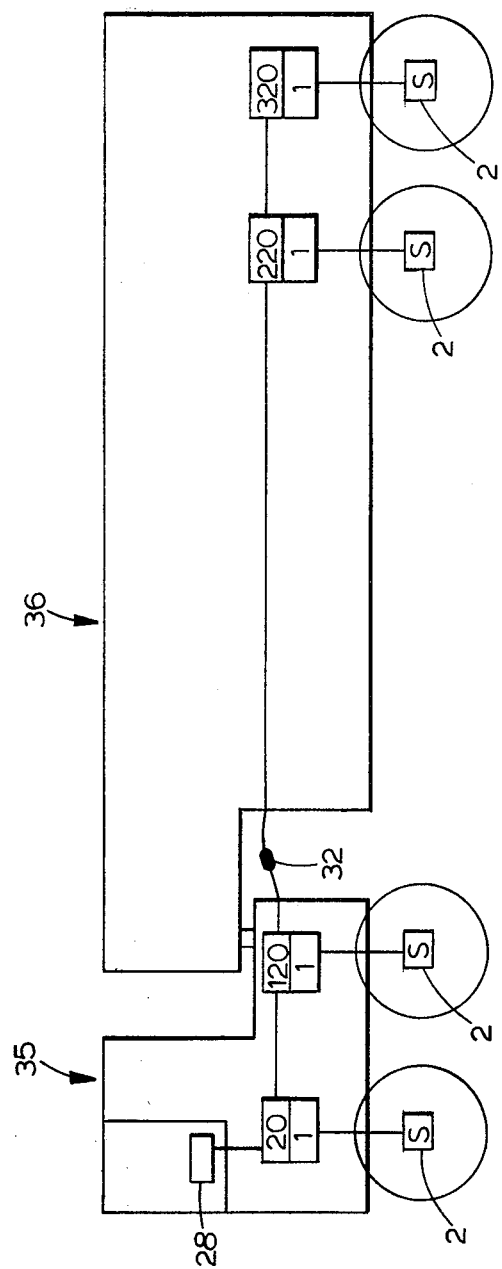
FIG. 7 is a schematic diagram of an articulated vehicle provided with the circuit of FIG. 4.

FIGS. 4 and 7 illustrate an arrangement of failsafe circuits in which the fault line connection from the output 30 of the monitor 28 to the input 17 of the first failsafe circuit 320 has been omitted and replaced by a connection from the positive supply line 22 to the input 17 of the failsafe circuit 320. A signal is therefore applied to the fault line at switch-on but no test pulse passes through the failsafe circuits. Instead, the test pulse is applied directly from the monitor output 30 to the monitor input 31 so as to test just the warning lamp. In FIG. 7 the single line connecting circuits 20, 120, 220 and 320 is intended to indicate a series of parallel connections.

Figure 5:
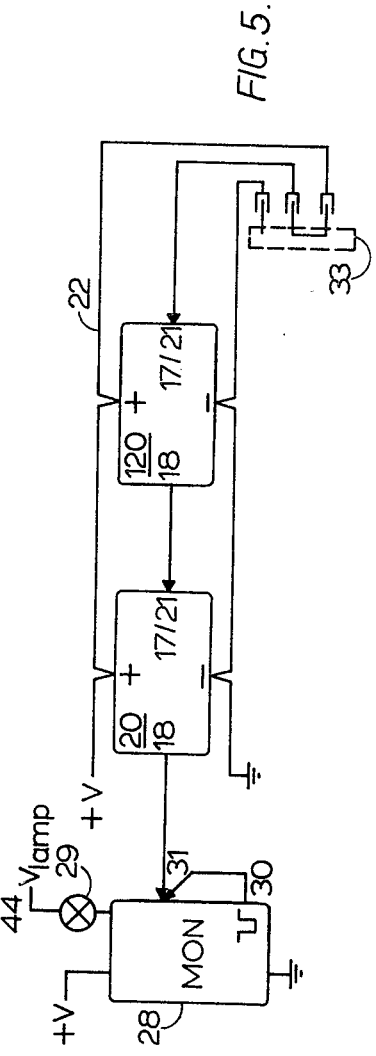
FIG. 5 is a circuit diagram corresponding to that of FIG. 4 but for the tractor only when disconnected from the trailer.

The arrangement illustrated in FIGS. 4 and 7 indicates how a connector plug 32 can be provided between the connections for the tractor unit 35 and the trailer 36 of a four-axle articulated vehicle, the tractor unit being provided with failsafe circuits 20 and 120 associated respectively with its two axles, and the trailer unit being provided with failsafe circuits 220 and 320 associated repectively with the two trailer axles. When the trailer 36 is not being used, the connector of the tractor unit 35 is connected, as shown in FIG. 5, to a device 33 that connects the inputs 17 and 21 of the failsafe circuit 120 to the positive supply so as to complete the fault line for the tractor unit alone.

If the braking systems used in the tractor unit and trailer are compatible, then the input connections 21 can be used as indicated above in order to allow the anti-lock brake control action of selected control modules to be disabled by a rearward fault.

Figure 6:
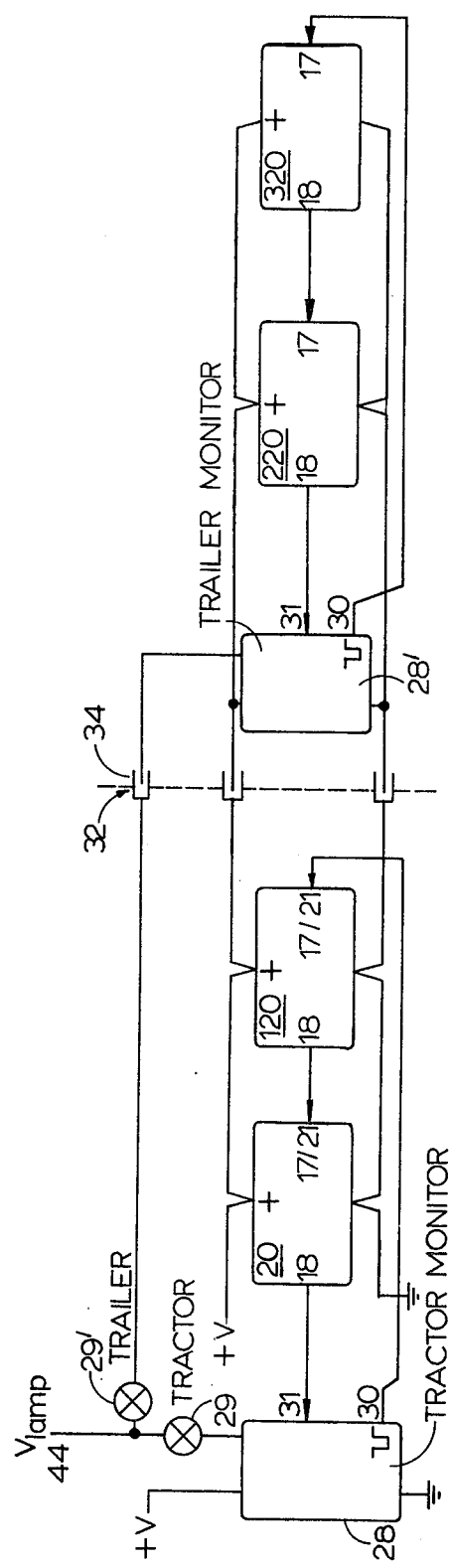
FIG. 6 is a further circuit diagram for an articulated vehicle, the circuit incorporating independent monitors for the failsafe circuits of the tractor and trailer respectively.

The arrangement illustrated in FIG. 6 shows the interconnections between the failsafe circuits 20, 120, 220 and 320 in an anti-lock brake control system for an articulated vehicle comprising a tractor unit and trailer each with two axles. In this arrangement separate monitor units 28 and 28' are provided for the tractor and trailer respectively and each is connected with its respective two failsafe units. A connector plug 32 is provided between the two parts of the system associated with the tractor and trailer, and this includes an output connection 34 from the monitor 28' for the trailer to a separate trailer warning lamp 29 in the driving cab. On switching on the ignition, a test pulse is produced by both monitors 28 and 28' to test both parts of the system and cause both warning lamps 29 and 29' to light up momentarily if the system is operating correctly. If the trailer is not coupled up to the tractor cab then the trailer warning lamp 29' in the cab is not lit up when ignition is switched on.

As indicated in FIG. 6, the input connections of the failsafe circuits used in the fault lines are such that only the anti-lock brake control action in the tractor unit can be disabled, the available terminals 21 not being utilised in the failsafe circuits 220 and 320 of the trailer.

Figure 8:
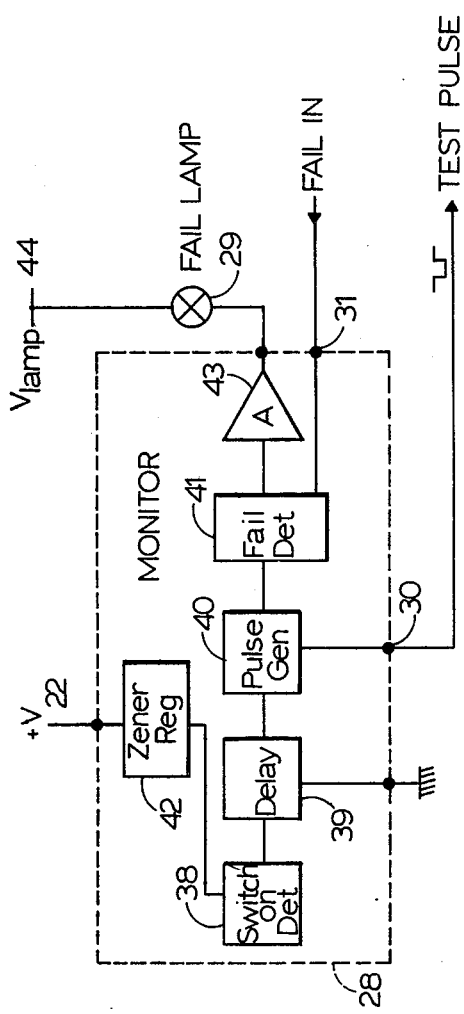
FIG. 8 is a block circuit diagram of the monitor unit which provides a fault pulse at switch-on of the vehicle ignition.

The fault warning monitor 28 will now be described in more detail with reference to FIGS. 8 and 9. The monitor 28 comprises a switch-on detector 38 which is arranged to be actuated by the vehicle ignition key to provide a signal to the input of a delay unit 30 of which the output is connected to the input of a pulse generator 40. The pulse generator 40 has two output connections one of which is connected to a failure detector unit 41 and the other of which is the output 30 referred to previously. The power supply to units 38 to 41 is provided by a zener regulator 42 connected to the +V supply 22. Failure detector 41 has a second input connected to input terminal 31 and has its output connected to an amplifier 43 for driving failure lamp 29.

Figure 9:
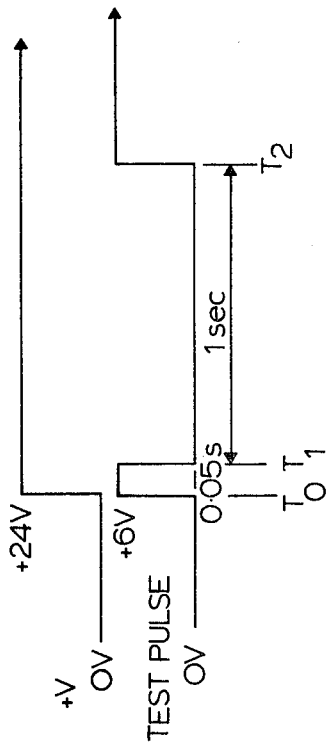
FIG. 9 shows in the upper part the supply voltage at switch-on, and in the lower part the fault pulse produced by the monitor unit.

FIG. 9 shows two graphs of voltage against time, the upper graph indicating the change in the supply voltage +V in the line 22 at switch-on of the ignition, and the lower graph indicating the change in voltage at the output terminal 30 during the same period. The ignition is switched on at time $T_0$ and initially the voltage of the output terminal 30 rises to its normal value. After a delay of approximately 0.05 s provided by the delay unit 39 the pulse generator 40 commences timing at time $T_1$ a one second fault pulse which brings the voltage of terminal 30 to zero until time $T_2$ when the voltage rises again to its full value to provide the normal input signal to the chain of failsafe circuits.

I claim:

1. A multi-axle wheeled vehicle comprising a respective brake for each axle, a respective speed sensor associated with each axle, a respective brake release means associated with each axle and responsive to the respective speed sensor to release the respective brake on the occurrence of a skid condition at that axle, a respective inhibit means associated with each brake release means and being operable by inhibit operation of that brake release means, a respective fault detection circuit associated with each brake release means and being responsive to a fault condition in that brake release means to operate the respective inhibit means so as to inhibit operation of the associated brake release means, a respective signal repeater circuit associated with each brake release means and having an input and an output, means connecting the inputs and outputs of the signal repeater circuits in series to form a chain so that a signal applied to the input of the first repeater circuit in said chain will normally be propagated along said chain to the output of the last repeater circuit in said chain, each signal repeater circuit being responsive to the respective fault detection circuit so as to interrupt the passage of said signal along said chain upon the occurrence of said fault condition, and a respective shutdown connection means associated with each inhibit means and for optional connection to the input of the respective signal repeater circuit so that, when connected, an interruption in said signal at said input due to a fault upstream thereof along said chain causes said inhibit means to be operated to inhibit operation of the associated brake release means, whereby in the event of said fault condition occurring in one of said brake release means, operation of selected brake release means downstream thereof is inhibited.

2. A multi-axle wheeled vehicle as claimed in claim 1, including a warning device responsive to the absence of said signal at the output of the last signal repeater circuit in said chain, and a switch arranged to apply to the input of the first signal repeater circuit in said chain on each operation of said vehicle a test pulse in the form of an interruption of said signal in order to check whether said signal is being propagated through said chain to said warning device.

3. A multi-axle wheeled vehicle as claimed in claim 2, including a delay device arranged to provide a delay between operation of said switch and application of said test pulse to the input of the first signal repeater circuit in said chain.

4. A multi-axle wheeled vehicle as claimed in claim 3, in which said delay device is adapted to provide a delay of about 0.05 seconds.

5. A wheeled vehicle having at least four axles and comprising a respective brake for each axle, a respective speed sensor associated with each axle, a respective brake release means associated with each axle and responsive to the respective speed sensor to release the respective brake on the occurrence of a skid condition at that axle, a respective inhibit means associated with each brake release means and being operable to inhibit operation of that brake release means, a respective fault detection circuit associated with each brake release means and being responsive to a fault condition in that brake release means to operate the respective inhibit means so as to inhibit operation of the associated brake release means, a respective signal repeater circuit associated with each brake release means and having an input and an output, first means connecting the inputs and outputs of the signal repeater circuits of at least two of the forward axles of said vehicle in series to form a first chain so that a first signal applied to the input of the first repeater circuit in said first chain will normally be propagated along said first chain to the output of the last repeater circuit in said first chain, second means connecting the inputs and outputs of the signal repeater circuits of at least two of the rearward axles of said vehicle in series to form a second chain so that a signal applied to the input of the first repeater circuit in said second chain will normally be propagated along said second chain to the output of the last repeater circuit in said second chain, each signal repeater circuit being responsive to the respective fault detection circuit so as to interrupt the passage of the respective signal along the respective chain upon the occurrence of said fault condition, and a respective shutdown connection means associated with each inhibit means and for optional connection to the input of the respective signal repeater circuit so that, when connected, a interruption in the respective signal at said input due to a fault upstream thereof along the respective chain causes said inhibit means to be operated to inhibit operation of the associated brake release means, whereby in the event of said fault condition occurring in one of said brake release means, operation of selected brake release means downstream thereof is inhibited.

* * * * *